United States Patent [19]

Peter et al.

[11] Patent Number: 5,545,961
[45] Date of Patent: Aug. 13, 1996

[54] ELECTRIC MOTOR DRIVE

[75] Inventors: Cornelius Peter, Buehl-Neusatz; Hartmut Seiler, Baden-Baden; Volker Aab, Lichtenau-Ulm; Guenter Haderer, Buehl, all of Germany

[73] Assignee: Robert Bosch GmbH, Stuttgart, Germany

[21] Appl. No.: 424,283

[22] PCT Filed: Oct. 8, 1993

[86] PCT No.: PCT/DE93/00952

§ 371 Date: Apr. 21, 1995

§ 102(e) Date: Apr. 21, 1995

[87] PCT Pub. No.: WO94/09240

PCT Pub. Date: Apr. 28, 1994

[30] Foreign Application Priority Data

Oct. 21, 1992 [DE] Germany .......................... 42 35 472.2
Mar. 12, 1993 [DE] Germany .......................... 43 07 866.4

[51] Int. Cl.⁶ .................................................. B60R 16/02
[52] U.S. Cl. ............................................ 318/647; 318/146
[58] Field of Search ................................... 318/140–158, 318/647; 388/815, 822

[56] References Cited

U.S. PATENT DOCUMENTS 4,810,941  3/1989  Ohishi et al. ........................ 388/815
5,299,277  3/1994  Fujii .................................... 388/815

FOREIGN PATENT DOCUMENTS

| 0026719 | 4/1981 | European Pat. Off. |
| 0310279 | 4/1989 | European Pat. Off. |
| 0393233 | 10/1990 | European Pat. Off. |
| 3411001 | 9/1985 | Germany |
| 9012217 U | 12/1990 | Germany |

*Primary Examiner*—Brian Sircus
*Attorney, Agent, or Firm*—Spencer & Frank

[57] ABSTRACT

An electric motor drive having a first section and a second section offset with respect to the first section. A control arrangement and an evaluation arrangement are arranged in the first section, and an electric motor and a sensor arrangement are arranged in the second section. The control arrangement is connected to the electric motor via two connecting lines. A signal is transmitted from the sensor arrangement to the evaluation arrangement via a third line. The electric energy for the sensor arrangement is transmitted via at least one of the two connecting lines and via the third line, or only via the two lines. The electric motor drive according to the invention is suitable for use in actuators which may be arranged in a motor vehicle.

13 Claims, 3 Drawing Sheets

ELECTRIC MOTOR DRIVE

The invention relates to an electric motor drive having a first section which contains a control circuit or arrangement and an evaluation circuit or arrangement, a second section which is offset with respect to the first section and contains an electric motor and a sensor arrangement, two electrical lines or wires which connect the control arrangement and the electric motor for supplying power to the electric motor, and at least one further line or wire connecting the evaluation arrangement and the sensor arrangement for transmitting an information signal provided by the sensor arrangement to the evaluation arrangement. German Utility Model 90 12 217.8 discloses an arrangement which contains an electric motor drive for opening and closing windows in a motor vehicle. A central device, which has control and evaluation circuit or arrangements, is connected to a plurality of drive units which are arranged in the doors of the motor vehicle. The drive units contain an electric motor and a sensor arrangement. The sensor arrangement detects a rotational speed of the drive. Provided between the central device and each drive unit are five connecting lines of or wires for signal transmission and energy transmission.

It is the object of the invention to simplify the cabling complexity in an electric motor drive having a first section, which contains a control circuit or arrangement and an evaluation circuit or arrangement, and having a second section, which is offset with respect to the first section and contains an electric motor arrangement and a sensor arrangement.

SUMMARY AND ADVANTAGES OF THE INVENTION

The above object is generally achieved by an electric motor drive according to the invention which has the advantage that only three connecting lines are required between the first and the second sections. Two of these lines connect the control arrangement contained in the first section to the electric motor contained in the second section. A third line connects the evaluation arrangement contained in the first section to the sensor arrangement contained in the second section.

In accordance with a preferred first embodiment of the electric motor drive according to the invention, the power supply of the sensor arrangement is provided via the third line and via at least one of the lines leading to the electric motor. Signal transmission takes place via the third line. The sensor arrangement prescribes the current flowing via the third line as a function of a sensor signal. The current flowing via the third line is therefore composed of the current for the power supply of the sensor arrangement and of the current prescribed for signal transmission.

The advantage of the first embodiment resides in that in the event of a prescribed short circuit of the electric motor, which the control arrangement can trigger for the purpose of rapid braking of the electric motor, the power supply of the sensor circuit arrangement can be ensured via the power supply lines leading to the motor without further measures. An energy store which is possibly provided and which is assigned to the sensor arrangement can therefore be of small dimensions or be completely eliminated, Advantageous developments and improvements of the first embodiment of the electric motor drive according to the invention follow from subclaims.

In an advantageous development, it is provided that the sensor arrangement is connected via two rectifier diodes to the two lines leading to the electric motor. It is possible by means of this measure to conduct the required potential of the power supply both via the one and via the other line leading to the motor. The direction of rotation of the electric motor can thus be changed over.

In a further advantageous development, a circuit is provided for the purpose of increasing the voltage in the evaluation circuit or arrangement. The circuit increases the voltage, and thus the power supply voltage supplied to the third line, with respect to the operating voltage of the electric motor. It is possible by means of this measure to short circuit the electric motor by connecting both of the two power supply lines to earth or to operating voltage potential. The circuit for increasing the voltage ensures, in each operating state, the required high potential for supplying power to the sensor arrangement via the third line.

In an advantageous configuration it is provided that the evaluation arrangement contains a current balancing circuit. The current balancing circuit converts the current flowing via the third line into a corresponding voltage which is to be evaluated simply in the following circuit.

In accordance with a second embodiment of the electric motor drive according to the invention, the power supply to the sensor arrangement is provided via the two lines leading to the electric motor. In this embodiment, it is possible to prescribe either the current flowing via the third line or the voltage present on the third line, as a function of the sensor signal.

In an advantageous development of the second embodiment of the electric motor drive according to the invention, it is provided that the sensor arrangement is connected via in each case two rectifier diodes to the two lines leading to the electric motor. It is possible by means of this measure to be able to prescribe the direction of rotation optionally.

Further advantageous configurations for the first and the second embodiment of the electric motor drive according to the invention follow from further subclaims.

In a further configuration, it is provided that the sensor arrangement contains at least one controlled current source. The current source impresses the current flowing via the third line on a permanently prescribed value, as a function of the sensor signal. The use of a plurality of current sources permits the prescription of different current levels.

The current signals or voltage signals transmitted to the evaluation arrangement are preferably fixed on two different discrete signal levels. A high resistance to interference signals can be achieved by means of this measure. This signal transmission is particularly advantageous for digital further processing of the signal.

The use of a differentiating arrangement in connection with a pulse length discriminator permits a high resistance to interference signals in the case of signal transmissions having a stepped signal characteristic. Interference signals which occur when disconnecting the electric motor are effectively suppressed, in common with the interference injected from external devices.

A pulse train fixed in advance, is, furthermore, particularly suitable, for signal transmission. The signal transmission thus corresponds to that of a simple serial single-wire interface. The pulse train permits coding of the most varied sensor signals, which are reliably transmitted to the evaluation arrangement by means of the digital method.

In an advantageous configuration of the electric motor drive according to the invention, it is provided that the sensor arrangement contains at least one sensor for detecting the position of a section driven by the electric motor. Particularly suitable is at least one Hall sensor which co-operates with a permanent magnet driven by the electric motor.

The electric motor drive according to the invention is particularly suitable as an actuator in motor vehicles. The low number of connecting lines between the first section and at least one second section is attended by savings in cost in mass production, and enhances the simplicity.

The electric motor drive according to the invention is explained in more detail in the following description with the aid of the drawing.

BRIEF DESCRIPTION OF THE DRAWINGS

Drawings

DETAILED DESCRIPTION OF THE PREFERRED EMBODIMENTS

Figure 1:
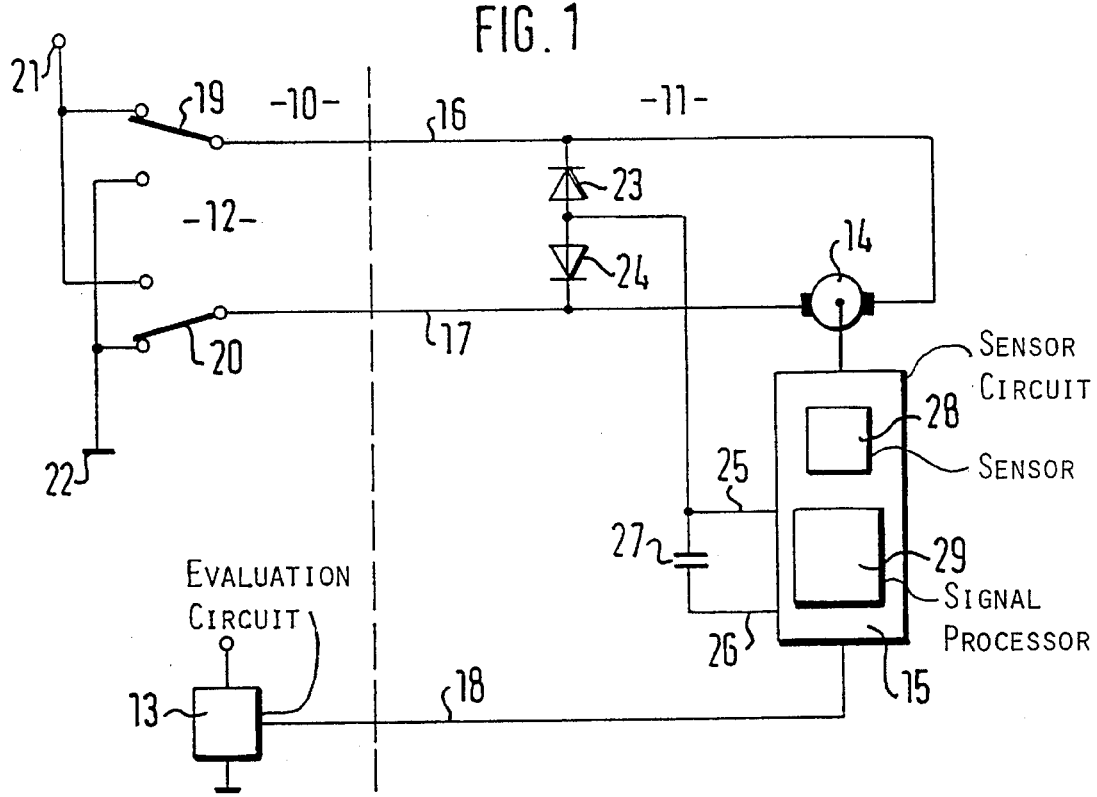
FIGS. 1 and 2 show respective exemplary embodiments of an electric motor drive according to the invention, each of which contains a first section having a control arrangement and an evaluation arrangement, and a second section having an electric motor and a sensor arrangement.

FIG. 1 shows a first section 10 and a second section 11, offset with respect to the first section 10, of an electric motor drive. The two sections 10, 11 are represented separated from one another by dashes. The first section 10 contains a control circuit or arrangement 12 and an evaluation arrangement 13.

The second section contains an electric motor 14 and a sensor circuit or arrangement 15.

The control arrangement 12 is connected by means of two connecting lines or wires 16, 17 to the electric motor 14 arranged in the second section 11. A third line 18 connects the evaluation arrangement 13 to the sensor arrangement 15 contained in the second section 11.

The control arrangement 12 contains first and second switching means 19, 20 which respectively connect the connecting lines 16, 17 either to an operating voltage terminal 21 or to earth 22. The connecting lines 16, 17 are respectively connected to rectifier diodes 23, 24 whose anodes are respectively connected to a first power supply terminal 25 of the sensor arrangement 15. A capacitor 27 is connected between the first power supply terminal 25 and a second power supply terminal 26 of the sensor arrangement 15. The sensor arrangement 15 contains a sensor 28, which is operationally connected to the electric motor 14. Furthermore, a signal-processing circuit or arrangement 29 is provided in the sensor arrangement 15.

Figure 2:
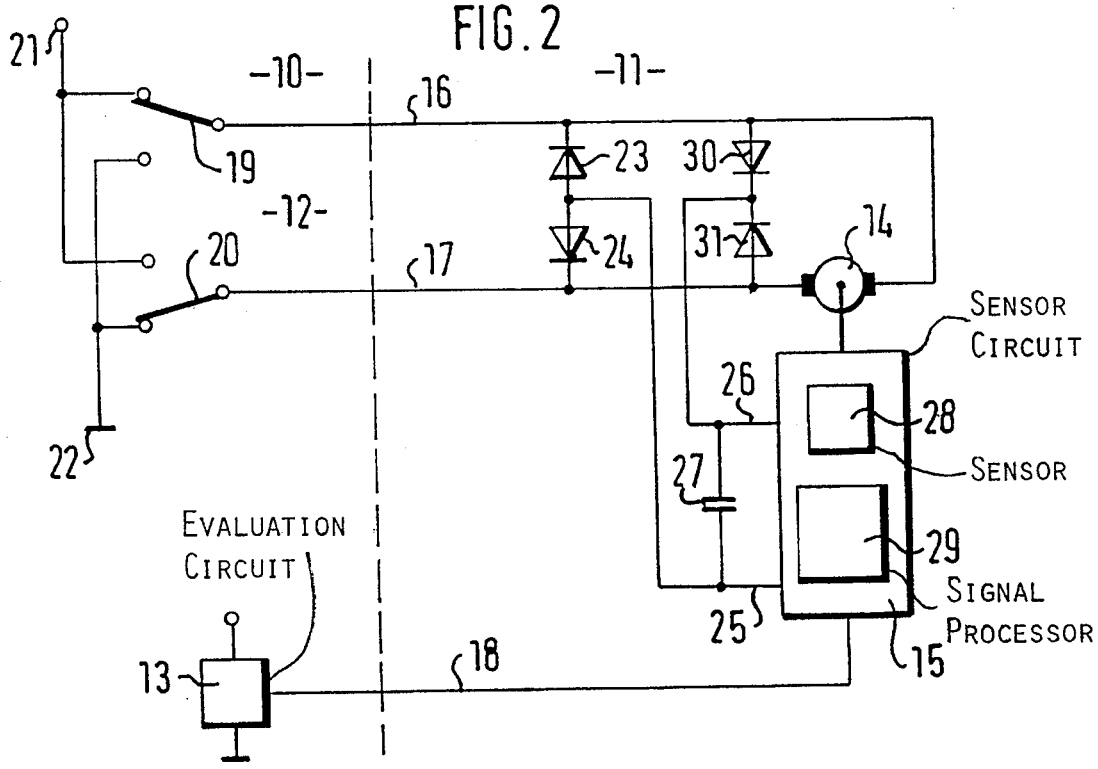

In the block diagram, shown in FIG. 2, of the electric motor drive containing the two sections 10, 11, those sections which correspond to the sections shown in FIG. 1 are respectively provided with the same reference numbers. The second power supply terminal 26 of the sensor arrangement 15 is connected via further rectifier diodes 30, 31 to the connecting lines 16, 17. The second power supply terminal 26 is respectively connected to the cathode terminals of the diodes 30, 31.

Figure 3:
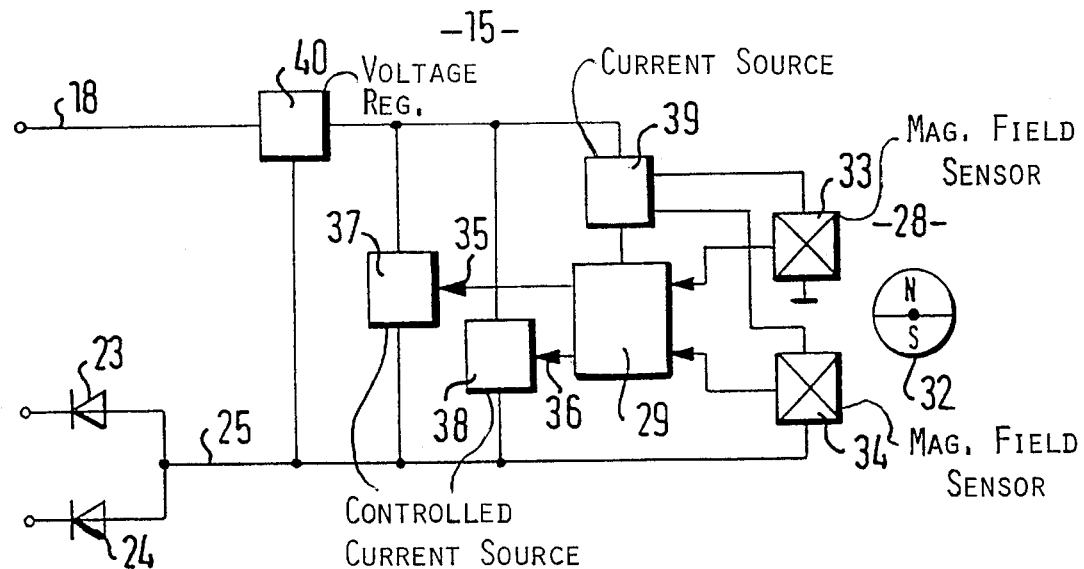
FIG. 3 shows an exemplary embodiment of a sensor arrangement.

FIG. 3 shows an exemplary embodiment of the sensor circuit or arrangement 15 shown in FIGS. 1 and 2. The sensor 28 contains at least one permanent magnet 32 which is driven by the electric motor 14 and co-operates with a first and second element 33, 34 sensitive to magnetic fields. The elements 33, 34 sensitive to magnetic fields output signals to the signal-processing arrangement 29 which provides control signals 35, 36 for controlled current sources 37, 38. A further current source 39 is provided for the purpose of supplying power to the elements 33, 34 sensitive to magnetic fields and to the signal-processing arrangement 29. The third line 18 leads to a voltage regulator 40 whose output is connected to the current sources 37, 38 and to the further current source 39. The voltage regulator 40 is connected, furthermore, to the first power supply terminal 25, which leads to the anode terminals of the rectifier diodes 23, 24. The diodes 23, 24 are drawn in once more in FIG. 3, in order to illustrate that the elements 33, 34, including the diodes 23, 24; 30, 31, shown in FIG. 3 can be accommodated within an integrated circuit, with the exception of the permanent magnet 32.

Figure 4:
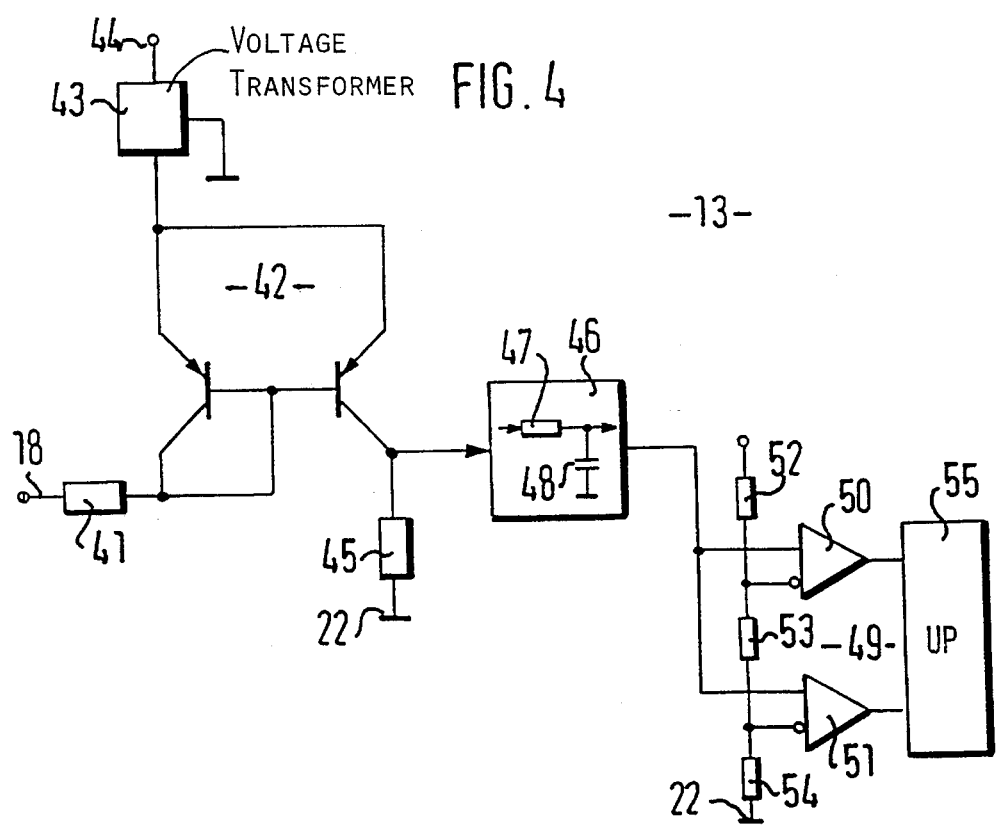
FIGS. 4 and 5 show exemplary embodiments of an evaluation arrangement.

FIG. 4 shows an exemplary embodiment of the evaluation circuit arrangement 13. The third line 18 leads via a resistor 41 to a current balancing circuit 42. Provided as power source is a voltage transformer circuit 43 which steps up to a higher potential the voltage present at a power supply terminal 44. A voltage which corresponds to the current flowing via the third line 18 occurs across a load resistance 45 on the output side. The voltage signal occurring at the load resistance 45 is passed to a comparator circuit arrangement 49 via a low-pass filter circuit or arrangement 46 which contains a resistor-capacitor combination 47, 48. The comparator circuit arrangement 49 contains two differential amplifiers 50, 51 whose inverting inputs are respectively connected to a resistor divider chain containing three resistors 52, 53, 54. The noninverting inputs of the differential amplifiers 50, 51 are connected to the low-pass filter 46. The differential amplifiers 50, 51 output output signals to a microprocessor 55.

Figure 5:
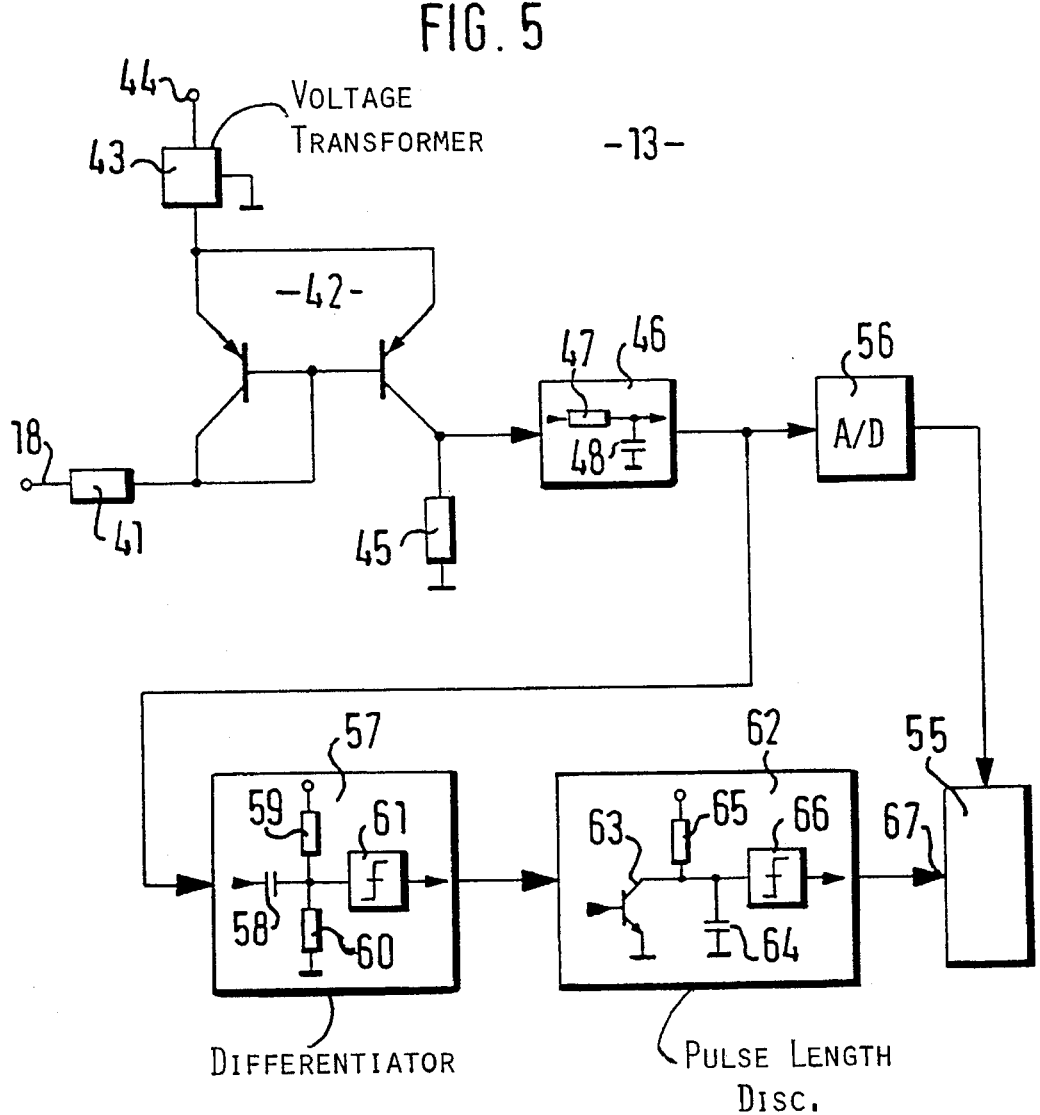

FIG. 5 shows another embodiment of the evaluation circuit arrangement 13. Those sections shown in FIG. 5 which correspond to the sections shown in FIG. 4 respectively bear the same reference numbers. An analog-to-digital converter 56 which outputs an output signal to the microprocessor 50 is provided in FIG. 5 instead of the comparator circuit arrangement 49 shown in FIG. 4. The signal occurring at the output of the low-pass filter 46 and fed to the analog-to-digital converter 56 is further fed to a differentiating circuit arrangement 57. The differentiating circuit arrangement 57 contains a capacitor 58, a voltage divider having two resistors 59, 60, and a trigger 61.

The output signal of the differentiating circuit arrangement 57 passes to a pulse length discriminator 62. The pulse length discriminator 62 contains a switching transistor 63 whose collector-emitter junction can be connected in parallel with a capacitor 64. The capacitor 64 can be charged via a resistor 65. The signal occurring at the capacitor 64 is fed to a further trigger 66, which outputs an output signal to an interrupt input 67 of the microprocessor 55.

Figure 6:
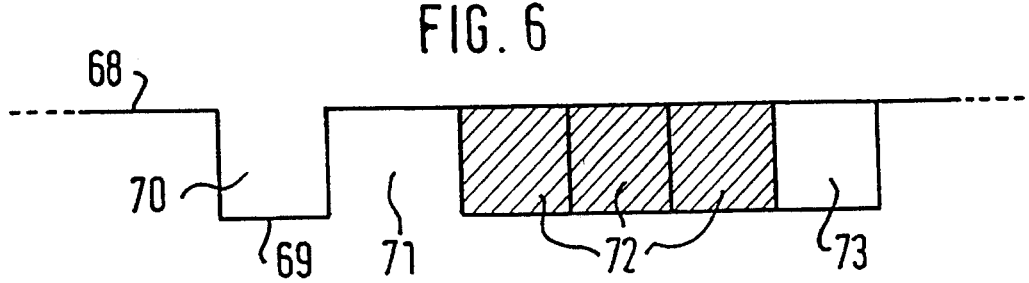
FIG. 6 shows an exemplary embodiment of a signal transmission between the two sections of an electric motor drive according to the invention.

FIG. 6 shows a pulse train which, starting from an idle level 68 can assume a second discrete level 69. The pulse train contains a start bit 70, a framing bit 71, information bits 72 and a stop bit 73.

The functioning of the electric motor drive according to the invention is firstly explained in more detail with the aid of the block diagrams shown in FIGS. 1 and 2:

The control arrangement 12 contained in the first section 10 and the evaluation arrangement 13 are accommodated, for example, in a central device to which at least one second section 11 is connected. The second section 11 is preferably contained in a housing which accommodates the electric motor 14 and the sensor arrangement 15 installed in the immediate vicinity 10 of the motor. The connecting lines 16, 17 and the third line 18 lead to each connected second section 11.

The control arrangement 12 has the task of prescribing the operating voltage on the connecting lines 16, 17 for the electric motor 14 in such a way that the electric motor 14 can be operated in one or the other direction of rotation. The control arrangement 12 contains the two switching means 19, 20, which connect the connecting lines 16, 17 either to the operating voltage terminal 21 or to earth 22. The switching means 19, 20 can also be operated in such a way that the two connecting lines 16, 17 can be connected either simultaneously to earth 22 or simultaneously to the operating voltage terminal 21 via the connecting lines 16, 17. The electric motor 14 can thus be short circuited. Rapid braking of the electric motor 14 is possible by means of this measure.

The electric motor 14 in the second section 11 is provided for the purpose of driving a movable part (not shown in more detail). Such a movable part is, for example, a component of an actuator which is preferably provided in a motor vehicle. The movable part is, for example, an antenna, a folding roof, a window, a rearview mirror, a part of a seat and/or a sliding roof.

In the electric motor drive according to the invention, a signal transmission is provided via the third line 18 from the second section 11 to the first section 10. What is transmitted is, for example, a signal dependent on rotational speed, a position signal, a signal for direction of rotation and/or, for example, a temperature signal. The transmitted signal is detected in the first section 10 in the evaluation arrangement 13. Driving of the electric motor 14 in one or the other direction, for example, is performed as a function of the detected signal. For example, by means of a rotational speed signal and/or position signal it is also possible to realize anti-trapping protection which prevents the trapping of objects or of body parts between the movable part and another fixed part (likewise not shown).

The signal-processing arrangement 29 contained in the sensor arrangement 15 generally requires a power supply. The sensor 28 also itself already frequently requires a power supply. Optoelectronic transmitters require energy for a radiation source which is possibly provided. Sensors sensitive to magnetic fields can likewise have a power requirement. A current has to be provided in the case of a sensor sensitive to magnetic fields which is based on the Hall effect. Magneto-resistive elements must likewise have a current flowing through them so that a sensor signal can be received.

In accordance with the first embodiment of the invention, the power supply of the sensor arrangement 15 is provided via the third line 18 and via at least one of the two connecting lines 16, 17. The first power supply terminal 25 of the sensor arrangement 15 is connected via the diodes 23, 24 acting as rectifiers, to the connecting lines 16, 17 leading to the electric motor 14. It is, firstly, ensured during operation of the electric motor 17 that the required polarity occurs on one of the two connecting lines 16 or 17. This is the negative potential in the exemplary embodiment shown. However, the power supply is also ensured at times when the electric motor 14 is at a standstill, because the switching means 19, 20 connect at least one of the two lines 16, 17 to earth 22, earth 22 corresponding to the negative potential. In the case of short circuiting of the electric motor 14 with respect to earth 22, both lines 16, 17 conduct negative potential. The positive potential is fed to the sensor arrangement 15 via the third line 18. The evaluation arrangement 13 connects the third line 18 via a circuit explained in more detail in FIGS. 4 and 5 to a power supply terminal which has the appropriate positive potential. It is also possible to provide the capacitor 27, which can undertake energy storage. The capacitor 27 is connected between the first power supply terminal 25 and the second power supply terminal 26 of the sensor arrangement 15. The second power supply terminal 26 can be connected, for example, internally directly to the third line 18. The energy storage in the capacitor 27 for a short time can be necessary in the operating state which obtains when for the purpose of braking the electric motor 14 the two switching means 19, 20 simultaneously connect the two connecting lines 16, 17 to the operating voltage terminal 21, which conducts positive potential. The capacitor 27 must in this case still provide energy for the sensor arrangement 15 until the electric motor 14 is braked. The capacitor 27 can also be completely eliminated in this case of operation by means of other measures, which are explained in more detail with the aid of the circuit diagrams shown in FIGS. 4 and 5.

The difference between the embodiments, shown in FIG. 1 and FIG. 2, of the electric motor drive according to the invention resides essentially in that in the embodiment shown in FIG. 2 the power supply for the sensor arrangement 15 is performed entirely via the two connecting lines 16, 17 leading to the electric motor 14. The rectifier diodes 23, 24 make negative potential available at the first power supply terminal 25, and the rectifier diodes 30, 31 make positive potential available at the second power supply terminal 26. The power supply is always ensured during operation of the electric motor 14. In order to be able to hold a satisfactory energy reserve ready even in the case of short circuiting of the electric motor 14 which may be provided, the capacitor 27 is always required for the purpose of energy storage even when the sensor arrangement 15 is to transmit signals to the evaluation arrangement 13 during the braking operation of the electric motor 14.

In a configuration of the embodiment, shown in FIG. 2, of the electric motor drive according to the invention, it is provided that the sensor arrangement 15 impresses the voltage on the third line 18. This configuration is possible because only the signal transmission from the second section 11 to the first section 10 takes place on the third line 18. A further advantage of the embodiment is provided by the optional fixing of the signal level, whether current or voltage, transmitted on the third line 18, which permits simple and reliable evaluation.

In the sensor arrangement 15 shown in FIG. 3, a magnetic field sensor, for example, is used as the basis for the sensor 28. The sensor 28 having two elements 33, 34 sensitive to magnetic fields, preferably Hall elements, outputs signals to the signal-processing arrangement 29 as a function of the position of the permanent magnet 32. The sensor 28 permits the provision of a rotational speed signal, a position signal and/or a signal for direction of rotation. The signal-processing arrangement 29 determines a signal to be transmitted via the third line 18 from the signal output by the sensor 28. By means of a control signal 35, 36, the signal-processing arrangement 29 prescribes either the voltage present on the third line 18 or the current flowing via the third line 18. In the exemplary embodiment shown, the signal-processing arrangement 29 drives two current sources 37, 38 which are preferably set to fixed different discrete current values. Consequently, four different current prescriptions are possible with the arrangement shown. The arrangement can be extended at will by further current sources, it being possible to go as far as transition to analog operation. In the case of the prescription of a current flowing via the third line 18, it is necessary for the current required for supplying power to the signal-processing arrangement 29 and, possibly, the sensor 28 to have a known value which can be taken into account in the evaluation arrangement 13. It is therefore advantageous for the further current source 39, which holds the supply current fixed independently of the voltage, to be arranged in the sensor arrangement 15.

An advantageous development provides the use of the voltage regulator 40. The voltage regulator 40 on the one hand prescribes a fixed operating voltage for the sensor arrangement 15. On the other hand, it reduces the influence of interference voltages. Such interference is, for example, negative pulses which are injected into the sensor arrangement 15 via the diodes 23, 24 upon disconnecting the electric motor 14.

The exemplary embodiment, shown in FIG. 4, of the evaluation arrangement 13 contains on the input side the current balancing circuit 42, which converts the current flowing via the third line 18 into a corresponding output voltage at the load resistance 45. The resistor 41 provided on the input side limits the current flowing via the third line 18 to a maximum value dependent on the operating voltage, and thus fulfils a protective function. The current balancing circuit 42 is explained in more detail, for example, in the textbook by U. TIETZE and CH. SCHENK, "Halbleiter-schaltungstechnik" ("Semiconductor circuit technology"), 5th Edition, Springer Verlag, 1980, page 54 and page 112, and so there is no need here for a detailed circuit description. The signal occurring at the load resistance 45 passes via the low-pass arrangement 46 to the comparator arrangement 49. The low-pass arrangement 46, which in the simplest case is realized as a resistor-capacitor combination 47, 48 as a low-pass filter of first order, reduces possibly injected radio-frequency interference to an extent which is not harmful. Instead of a low-pass filter of first order, it is also possible to provide a low-pass filter of higher order or a band-pass filter circuit. The comparator arrangement 49 permits the detection of four different voltage ranges. The individual ranges are fixed by the resistors 52, 53, 54 connected as a voltage divider. Taps of the voltage divider are connected to the inverting inputs of two differential amplifiers 50, 51. The output signals of the two differential amplifiers 50, 51 are fed to input ports of the microprocessor 55, which undertakes further signal evaluation and signal processing. The microprocessor 55 determines therefrom, for example, a rotational speed, a rotary position, a direction of rotation or another value detected by the sensor 28 or a derived variable.

A particularly advantageous development provides for the use of the voltage converter circuit 43. The voltage converter circuit 43, whose circuit is known, for example, from the textbook by U. TIETZE and CH. SCHENK already cited, increases the voltage present at the power supply terminal 44 to a higher value. The power supply terminal 44 is generally at the same potential as the operating voltage terminal 21 for the operating voltage of the electric motor 14. The voltage convertor circuit 43 therefore still permits a reliable power supply to the sensor arrangement 15 even when the two switching means 19, 20 simultaneously connect the electric motor 14 to the first operating voltage terminal 21 for the purpose of short-circuiting the motor.

Another possibility for ensuring the power supply to the sensor arrangement 15 when the two switching means 19, 20 for breaking the electric motor 14 simultaneously connect the two connecting lines 16, 17 to the operating voltage terminal 21 consists in changing the polarity on the third connecting line 18. The negative potential is conducted via the third line 18, while the positive potential is provided via at least one of the two connecting lines 16, 17. In the exemplary embodiment shown in FIG. 1, the polarity of the diodes 23, 24 must be changed. The first power supply terminal 25 of the sensor arrangement 15 is to be connected to the cathode terminals of the diodes 23, 24. Furthermore, in the evaluation arrangement 13 the current balancing circuit 42 is to change its polarity. Instead of the PNP transistors shown in FIG. 4, use is made of NPN transistors whose emitters are respectively connected to earth 22. The load resistance 45 is to be connected to the power supply terminal 44.

A further exemplary embodiment of the evaluation arrangement 13 is shown in FIG. 5. Instead of being fed to the comparator arrangement 49 shown in FIG. 4, the signal output from the low-pass arrangement 46 is fed directly to the analog-to-digital converter 56. The convertor 56 can be contained in a microprocessor 55. The advantage of this configuration resides in that it is possible by means of the converter 56 to detect substantially more than four different signal levels without extra outlay.

The further signal processing shown in FIG. 5 can be used both for the evaluation arrangement 13 shown in FIG. 4 and for the evaluation arrangement 13 shown in FIG. 5. The embodiment relates to the provision of a switching signal which is largely free of interference signals. Such a switching signal can preferably be used to control the microprocessor 55.

In FIG. 5, the switching signal is applied, for example, to the interrupt input 67 of the microprocessor 55. The signal which can be tapped at the low-pass filter 46 is fed to the differentiating arrangement 57, which particularly emphasizes the signal changes. Such signal changes occur, in particular, in the case of signals which change in step form and are transmitted via the third line 18. The differentiating arrangement 57 detects as genuine transitions only such transitions which exceed the at least one prescribed operating point of the trigger 61. The output potential for the input signal of the trigger 61 is fixed by the voltage divider with the resistors 59, 60. A multiplicity of disturbing pulses are already blanked out by suitable selection of the threshold for the trigger 61. Useful signals and interference signals which overcome a threshold of the trigger 61 pass to the pulse discriminator 62.

The pulse discriminator 62 allows only those signals to pass whose pulse length exceeds a prescribed measure. The time is fixed essentially by the value of the resistor 65 and the value of the capacitor 64. The capacitor 64 is charged via the resistor 65. Input pulses occurring effect discharging of the capacitor 64 via the switching transistor 63. Pulses which follow one another at short intervals prevent the potential at the capacitor 64 from rising above a threshold value with which the signal is compared in the further trigger 66. Only those pulses whose length exceeds the prescribed measure pass as switching signal to the interrupt input 67 of the microprocessor 55. The analog-to-digital converter 56 can, for example, be controlled as a function of the interrupt signal.

It is provided in an advantageous embodiment that the signal transmission is undertaken by means of a pulse train via the third line 18. The transmission corresponds to a serial, unidirectional interface.

An exemplary embodiment for the configuration of the pulse train is shown in FIG. 6. Starting from the idle level 68, a second discrete level 69 is provided. The binary transmission can be carried out, for example, by means of a current source 37, 38 contained in the sensor arrangement 15. The signal transmission starts with a start bit 70, downstream of which a framing bit 71 for the reliable detection of the start bit 70 is connected, which has a different level by comparison with the start bit 70. Following thereupon is a known number of information bits 72 which are terminated by a stop bit 73. Thereafter, the transmission again assumes the idle level 68 until a renewed pulse train is transmitted.

We claim:

1. An electric motor drive having a first section which contains a control circuit and an evaluation circuit; a second section which is offset with respect to the first section and contains an electric motor and a sensor circuit; two power supply lines connecting the control circuit and the electric motor for supplying power to the electric motor; a circuit for supplying power to the sensor circuit via at least one of the two power supply lines leading to the electric motor and via a third line connecting the evaluation circuit and the sensor circuit; and wherein the third line further serves for the transmission to the evaluation circuit of an information signal provided by the sensor circuit.

2. The drive as claimed in claim 1, wherein the sensor circuit is connected via two rectifier diodes to the two power supply lines leading to the electric motor.

3. The drive as claimed in claim 1, wherein the sensor circuit controls the current flowing via the third line as a function of a sensor signal.

4. The drive as claimed in claim 3, wherein the sensor circuit contain at least one controlled current source.

5. The drive as claimed in claim 3, wherein the evaluation arrangement contains a current balancing circuit.

6. The drive as claimed in claim 1, wherein the evaluation circuit contains a circuit for increasing the voltage applied to the third line with respect to the operating voltage of the electric motor.

7. The drive as claimed in claim 1, wherein the evaluation circuit contains a series connection of a differentiating circuit and a pulse length discriminator.

8. The drive as claimed in claim 1, wherein a capacitor is provided for at least briefly storing the energy required for the evaluation arrangement.

9. The drive as claimed in claim 1, wherein the sensor circuit produces at least two different discrete signal levels for transmission via the third line.

10. The drive as claimed in claim 9, wherein the signal transmission is provided by a fixed pulse train.

11. The drive as claimed in claim 1, wherein the sensor circuit contains at least one sensor for detecting the position of a section driven by the electric motor.

12. The drive as claimed in claim 11, wherein said at least one sensor is a Hall sensor.

13. A motor vehicle having an actuator including a motor drive having a first section which contains a control circuit arrangement and an evaluation circuit; a second section which is offset with respect to the first section and contains an electric motor and a sensor circuit; two power supply lines connecting the control circuit and the electric motor for supplying power to the electric motor; a circuit for supplying power to the sensor circuit via at least one of the two power supply lines leading to the electric motor and via a third line connecting the evaluation circuit and the sensor circuit; and with the third line further serving for the wherein transmission to the evaluation circuit of an information signal provided by the sensor circuit.

* * * * *